May 10, 1927.

W. B. LASKEY

METHOD OF MAKING CANDY

Filed April 30, 1921

1,628,251

INVENTOR:
William B. Laskey.
by Macleod, Calver, Copeland & Dike
Attys

Patented May 10, 1927.

1,628,251

UNITED STATES PATENT OFFICE.

WILLIAM B. LASKEY, OF MARBLEHEAD, MASSACHUSETTS.

METHOD OF MAKING CANDY.

Application filed April 30, 1921. Serial No. 465,643.

My invention relates to a new method of forming candy from materials having little or no tensile strength into sticks or short pieces having an ornamented exterior, and in a more specific embodiment of the invention into tubular form, both the exterior and interior of which may be ornamented.

The invention is applicable particularly to the manufacture of sweet chocolate.

The particular object of the invention is to shape products of this nature into pieces of the kind described and having an ornamented surface without resorting to any molding or casting operation.

Molding or casting is expensive, both on account of the labor involved and because the cost of molds in quantities sufficient to produce goods on a considerable scale is very great. Furthermore it is impossible in commercial practice to produce tubular or cylindrical pieces by casting or molding, as it is necessary to cast each piece in halves and afterwards stick the halves together.

I have found by experiment that rods having ornamented exteriors, and tubular pieces having ornamented exteriors and interiors, may be produced from any of the foregoing materials by forcing the material in its ordinary unmelted condition through suitable dies which shape the material and give it the ornamented surface required. I find in practice that the material, even though as hard or harder than ordinary cakes of sweet chocolate, may be forced through a die if sufficient pressure is used, and that on leaving the die, it is hard and strong enough for shipment. The result is that my method provides a process for making goods of this kind at a very rapid rate and at a great reduction of cost. The machine for practising my process is very inexpensive as compared with chocolate casting machines, and has a very large capacity.

It will be understood that my improved process is applicable to the manufacture of pieces of candy which can be produced by severing into predetermined lengths the continuous length of candy produced by the machine, and that except for severing, the piece of goods is complete on emerging from the die.

The invention will be fully understood from the following description when taken in connection with the accompanying drawings, and the novel features thereof will be pointed out and clearly defined in the claim at the close of this specification.

In the drawings, Fig. 1 is a side elevation of a piece of candy made as described herein.

Figure 1:
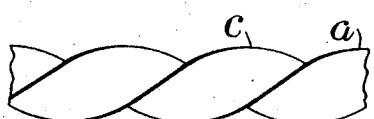
Figure 2:
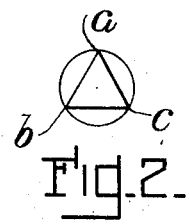
Fig. 2 is an end elevation of a piece of candy.

Referring now to the drawings, in Figures 1 and 2 I have shown a piece of candy, the exterior of which is ornamented with spiral ribs $a$, $b$ and $c$. The cross section of this piece of candy is triangular and the stick has the appearance of having been twisted. To make this piece of goods, I make a suitable mixture which, for instance, may contain cocoa powder, sugar or other sweetening material, starch, milk and nuts, this compound being solid under ordinary conditions but becoming sufficiently plastic when subjected to heavy pressure to permit expression thereof through a die.

Figure 3:
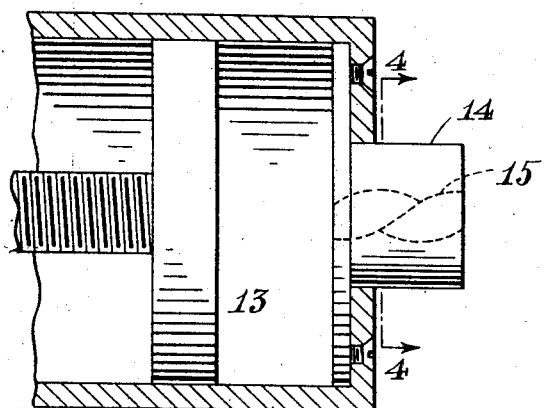
Fig. 3 is a view in section of a machine for producing a piece of candy such as shown in Figs. 1 and 2.
Figure 4:
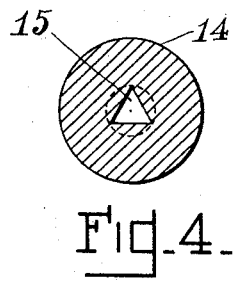
Fig. 4 is a section on line 4—4 of Fig. 3.

The composition is placed in a cylinder 12, having a piston 13 and a die 14, having an orifice 15 shaped as shown in Figures 3 and 4. The composition in the cylinder 12 is then subjected to a heavy pressure by the piston 13, as for instance by a hydraulic press, and the composition is forced through the die, being exuded in a long continuous piece which is then cut up into pieces ready for shipment.

I find that when the composition contains the proper ingredients, the operation may be performed at ordinary room temperatures, and on emerging from the die, the piece retains the shape thus given it.

Figure 7:
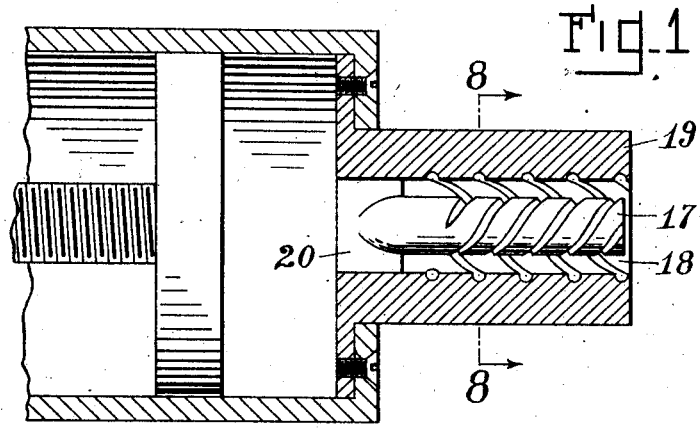
Fig. 7 is a section of a machine by means of which the piece shown in Figures 5 and 6 is produced.
Figure 8:
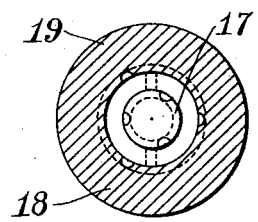
Fig. 8 is a section on line 8—8 of Fig. 7.
Figure 5:
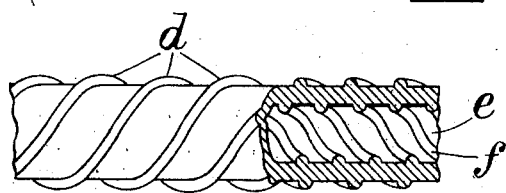
Fig. 5 is a side elevation and Fig. 6 an end elevation of a tubular piece of candy made in accordance with the herein descibed process.
Figure 6:
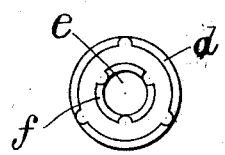

In Figures 5 and 6, I have shown a hollow tubular piece of goods having exterior spiral ribs $d$ and a bore $e$ also ornamented with spiral ribs $f$, the cross section of the piece being as shown in Figure 6. This piece is made by a machine similar to that shown in Figure 3, but having a die (see Figure 7) which includes a central member 17 of proper cross section supported within the orifice 18 of the die 19 by a supporting member 20.

From the foregoing it will be seen that the exterior of both pieces of candy shown in Figures 1 and 5, as well as the interior of the piece shown in Figure 5, are ornamented by ribs extending the length of the candy. The ribs shown in these figures are spiral so that the candy has a twisted appearance, but it will be understood that I do not limit myself to the production of candy of this form by my novel method. Other forms of goods which may be produced will readily occur to those skilled in the art; for instance, goods of circular or cylindrical cross section or goods of these cross sections having ribs on their surfaces may easily be produced.

Of course, it also will be understood that I do not limit myself to performing the method at room temperatures, since it is within the skill of the operator to choose the temperatures at which the best results will be obtained with the mixture or composition being employed at the time, particularly as I believe myself to be the first to produce from material lacking in tenacity ornamented pieces of the kind described by pressing the composition in a continuous length through a die.

What I claim is—

The method of forming chocolate candy in elongated form, which consists in forcing cold solid chocolate composition through a die under sufficiently heavy pressure to form a continuous piece of chocolate which retains the shape given it by said die.

In testimony whereof I affix my signature.

WILLIAM B. LASKEY.